(12) United States Patent
Shinada et al.

(10) Patent No.: US 11,327,366 B2
(45) Date of Patent: May 10, 2022

(54) METHOD FOR PRODUCING LIQUID CRYSTAL DISPLAY DEVICE AND ELECTRONIC APPARATUS

(71) Applicant: SHARP KABUSHIKI KAISHA, Sakai (JP)

(72) Inventors: Kei Shinada, Sakai (JP); Taichi Sasaki, Sakai (JP); Masahiro Shimizu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 8 days.

(21) Appl. No.: 16/936,880

(22) Filed: Jul. 23, 2020

(65) Prior Publication Data

US 2021/0026205 A1  Jan. 28, 2021

Related U.S. Application Data

(60) Provisional application No. 62/879,223, filed on Jul. 26, 2019.

(51) Int. Cl.
| | | |
|---|---|---|
| *G02F 1/1337* | (2006.01) | |
| *G02F 1/1368* | (2006.01) | |
| *G02F 1/1343* | (2006.01) | |
| *G02F 1/1341* | (2006.01) | |
| *G02F 1/1335* | (2006.01) | |
| *G02F 1/1333* | (2006.01) | |

(52) U.S. Cl.
CPC ...... *G02F 1/133788* (2013.01); *G02F 1/1341* (2013.01); *G02F 1/1368* (2013.01); *G02F 1/133345* (2013.01); *G02F 1/133516* (2013.01); *G02F 1/133528* (2013.01); *G02F 1/134309* (2013.01); *G02F 1/133519* (2021.01); *G02F 1/134372* (2021.01); *G02F 2201/121* (2013.01); *G02F 2201/123* (2013.01)

(58) Field of Classification Search
None
See application file for complete search history.

(56) References Cited

U.S. PATENT DOCUMENTS

| | | |
|---|---|---|
| 2002/0041354 A1 | 4/2002 | Noh et al. |
| 2012/0138922 A1 | 6/2012 | Yamazaki et al. |

(Continued)

FOREIGN PATENT DOCUMENTS

| | | |
|---|---|---|
| JP | 2002-182230 A | 6/2002 |
| JP | 2012-134475 A | 7/2012 |

*Primary Examiner* — Ryan Crockett
(74) *Attorney, Agent, or Firm* — ScienBiziP, P.C.

(57) ABSTRACT

A method for manufacturing a liquid crystal display device includes a step (A) of preparing an active matrix substrate, a step (B) of preparing a counter substrate, and a step (C) of producing a liquid crystal display panel using the prepared active matrix substrate and counter substrate. The step (C) includes a step (C1) of bonding the active matrix substrate with the counter substrate with a predetermined gap interposed therebetween and a step (C2) of forming a liquid crystal layer before or after the step (C1). An alignment film is an alignment film having a specific resistance of $1 \times 10^{14}$ Ω·cm or greater when a backlight is illuminated. The step (C) further includes, after the steps (C1) and (C2), a step (C3) of irradiating the active matrix substrate, the liquid crystal layer, and the counter substrate with ultraviolet light.

22 Claims, 2 Drawing Sheets

(56) References Cited

U.S. PATENT DOCUMENTS

| | | |
|---|---|---|
| 2013/0214273 A1 | 8/2013 | Yamazaki et al. |
| 2014/0183532 A1 | 7/2014 | Yamazaki et al. |
| 2015/0179805 A1 | 6/2015 | Yamazaki et al. |
| 2016/0240694 A1 | 8/2016 | Yamazaki et al. |
| 2017/0309754 A1 | 10/2017 | Yamazaki et al. |
| 2018/0004046 A1* | 1/2018 | Lee .................. G02F 1/133723 |
| 2018/0308989 A1 | 10/2018 | Yamazaki et al. |
| 2018/0356701 A1* | 12/2018 | Hyodo .................. G02F 1/1343 |
| 2019/0391327 A1* | 12/2019 | Watanuki .............. H01L 25/167 |

* cited by examiner

METHOD FOR PRODUCING LIQUID CRYSTAL DISPLAY DEVICE AND ELECTRONIC APPARATUS

CROSS-REFERENCE TO RELATED APPLICATION

The present application claims priority from Provisional Application No. 62/879,223, the content to which is hereby incorporated by reference into this application.

BACKGROUND OF THE INVENTION

1. Field of the Invention

The present invention relates to a method for manufacturing a liquid crystal display device, and an electronic apparatus.

2. Description of the Related Art

In recent years, a fringe field switching (FFS) mode has often been adopted as a display mode for a small- and medium-sized liquid crystal display device used in a tablet, a laptop PC, and a smartphone. For example, Japanese Unexamined Patent Application Publication No. 2002-182230 discloses an FFS mode liquid crystal display device.

In the FFS mode liquid crystal display device, a pair of electrodes for generating a fringe electrical field is provided on one of a pair of substrates that sandwich a horizontally-aligned liquid crystal layer. The pair of electrodes is typically configured by a pixel electrode with a plurality of slits formed therein, and a common electrode disposed below the pixel electrode with an insulating layer interposed therebetween. When a voltage is applied between the pixel electrode and the common electrode, the fringe electrical field is generated and an alignment regulating force of the fringe electrical field changes an alignment direction of liquid crystal molecules.

In this way, in the FFS mode liquid crystal display device, an alignment state of the liquid crystal molecules is controlled using the fringe electrical field. In the FFS mode, since the liquid crystal molecules rotate in a plane parallel to a display surface, high viewing angle characteristics are obtained.

Up until now, a rubbing treatment has been often performed on an alignment film of the FFS mode liquid crystal display device. However, in recent years, it is conceivable to perform an optical alignment treatment (in other words, to use an optical alignment film as the alignment film) in order to reduce unevenness in the alignment.

Further, an active matrix substrate used in the liquid crystal display device is provided with a thin film transistor (hereinafter referred to as a "TFT"), which serves as a switching element, for each of pixels. As such a TFT, a TFT using an oxide semiconductor layer as an active layer (hereinafter referred to as an "oxide semiconductor TFT") is known. Japanese Unexamined Patent Application Publication No. 2012-134475 discloses a liquid crystal display device in which InGaZnO (an oxide composed of indium, gallium, and zinc) is used in the active layer of the TFT.

The oxide semiconductor TFT can be operated at a higher speed than an amorphous silicon TFT. In addition, since an oxide semiconductor film is formed by a process simpler than that of a polycrystalline silicon film, the oxide semiconductor film can be applied to a device that requires a large area. Therefore, the oxide semiconductor TFT is expected to be a high performance active element that can be produced while suppressing the number of manufacturing steps and also suppressing manufacturing costs.

Further, since the oxide semiconductor TFT has excellent off-leak characteristics, a driving method can be used that performs display with a reduced rewriting frequency of an image. For example, when displaying a static image, the oxide semiconductor TFT can be operated so that the image data is rewritten at a frequency of once per second. Such a driving method is referred to as a pause drive or a low frequency drive, and can significantly reduce the power consumption of the liquid crystal display device.

SUMMARY OF THE INVENTION

The present inventors have studied adoption of a material having a specific resistance higher than that of conventional materials, as an alignment film material for an FFS mode liquid crystal display device. The studied alignment film material is excellent in terms of improving a contrast ratio, burn-in resistance, and long-term reliability (stability of a voltage retention rate).

According to the study conducted by the present inventors, it has been ascertained that when the above-described alignment film material is used, a new problem arises in which an optimal common voltage (hereinafter also referred to as an "optimal Vcom") significantly shifts during use of the liquid crystal display device. When the optimal Vcom shifts, flicker and burn-in become more likely to be visually recognized. In particular, when the low frequency drive is executed using the characteristics of an oxide semiconductor TFT, negative effects on the flicker caused by the shift of the optimal Vcom become even more evident.

The present invention has been made in light of the above-described problems, and an object of the present invention is to suppress a shift in the optimal Vcom when an alignment film having a high specific resistance is used in an FFS mode liquid crystal display device.

The present specification discloses a method for manufacturing a liquid crystal display device and an electronic apparatus according to the following items.

Item 1

A method for manufacturing a liquid crystal display device that includes a liquid crystal display panel including an active matrix substrate, a counter substrate facing the active matrix substrate, a liquid crystal layer provided between the active matrix substrate and the counter substrate, and a backlight disposed on a back surface side of the liquid crystal display panel.

The active matrix substrate includes a first substrate, an alignment film that is provided on the liquid crystal layer side of the first substrate and defines an initial alignment direction of liquid crystal molecules, and a pixel electrode and a common electrode that are provided between the first substrate and the alignment film and generate a fringe electric field that causes the liquid crystal molecules to be aligned in a different direction from the initial alignment direction.

The method includes a step (A) of preparing the active matrix substrate, a step (B) of preparing the counter substrate, and a step (C) of producing the liquid crystal display panel using the active matrix substrate and counter substrate prepared.

The step (C) includes a step (C1) of bonding the active matrix substrate with the counter substrate with a predetermined gap interposed between the active matrix substrate and the counter substrate, and a step (C2) of forming the liquid crystal layer at one of before and after the step (C1).

The alignment film is an alignment film having a specific resistance of $1 \times 10^{14}$ Ω·cm or greater when the backlight is illuminated, and the step C further includes, after the steps (C1) and (C2), a step (C3) of irradiating the active matrix substrate, the liquid crystal layer, and the counter substrate with ultraviolet light.

Item 2

In the method according to item 1, an irradiation amount of the ultraviolet light is from 5 J/cm² to 25 J/cm² at the step (C3).

Item 3

In the method according to item 1 or 2, a peak wavelength of the ultraviolet light irradiated at the step (C3) is from 370 nm to 400 nm.

Item 4

In the method according to any one of items 1 to 3, the irradiation of ultraviolet light is performed from a side of the active matrix substrate at the step (C3).

Item 5

In the method according to item 4, the step (C) further includes, after the step (C3), a step (C4) of adhering a polarizer to a back surface side of the first substrate.

Item 6

In the method according to any one of items 1 to 5, the alignment film is an optical alignment film.

Item 7

In the method according to item 6, the optical alignment film is one of an isomerized, decomposed, and dimerized optical alignment film.

Item 8

In the method according to item 6 or 7, the step (A) includes a step (A1) of irradiating the alignment film with polarized ultraviolet light to perform an optical alignment treatment.

Item 9

In the method according to any one of items 1 to 8, the liquid crystal molecules have negative dielectric anisotropy.

Item 10

In the method according to any one of items 1 to 9, the liquid crystal display device is configured to be driven at a frequency of 40 Hz or less.

Item 11

In the method according to any one of items 1 to 10, the pixel electrode is provided on the common electrode with an insulating layer interposed between the pixel electrode and the common electrode.

Item 12

In the method according to item 11, the insulating layer includes one of a silicon nitride layer, a silicon oxide layer, and a silicon oxynitride layer.

Item 13

In the method according to item 12, the insulating layer has a layered structure including two layers of the silicon nitride layer, the silicon oxide layer, and the silicon oxynitride layer.

Item 14

In the method according to any one of items 1 to 13, the counter substrate includes a second substrate and a color filter layer provided on the liquid crystal layer side of the second substrate.

Item 15

In the method according to item 14, the counter substrate further includes an overcoat layer covering the color filter layer.

Item 16

In the method according to any one of items 1 to 15, the counter substrate includes a second substrate, and an additional alignment film that is provided on the liquid crystal layer side of the second substrate and defines an initial alignment direction of liquid crystal molecules.

Item 17

In the method according to item 16, the additional optical alignment film is an optical alignment film.

Item 18

In the method according to item 17, the additional optical alignment film is one of an isomerized, decomposed, and dimerized optical alignment film.

Item 19

In the method according to item 17 or 18, the step (B) includes a step (B1) of irradiating the additional alignment film with polarized ultraviolet light to perform an optical alignment treatment.

Item 20

In the method according to any one of items 1 to 19, each of the pixel electrode and the common electrode is formed from one of indium tin oxide and indium zinc oxide.

Item 21

In the method according to any one of items 1 to 20, the active matrix substrate further includes a TFT electrically connected to the pixel electrode.

Item 22

In the method according to item 21, the TFT includes an oxide semiconductor layer.

Item 23

In the method according to item 22, the oxide semiconductor layer includes an In—Ga—Zn—O based semiconductor.

Item 24

In the method according to item 23, the In—Ga—Zn—O based semiconductor includes a crystalline portion.

Item 25

An electronic apparatus including the liquid crystal display device manufactured by the method according to any one of items 1 to 24.

According to an embodiment of the present invention, a shift in the optimal Vcom can be suppressed when using an alignment film having a high specific resistance in an FFS mode liquid crystal display device.

DETAILED DESCRIPTION OF THE INVENTION

Hereinafter, a method for manufacturing a liquid crystal display device according to an embodiment of the present invention will be described with reference to the accompanying drawings. Note that the present invention is not limited to the embodiment to be described below.

Figure 1:
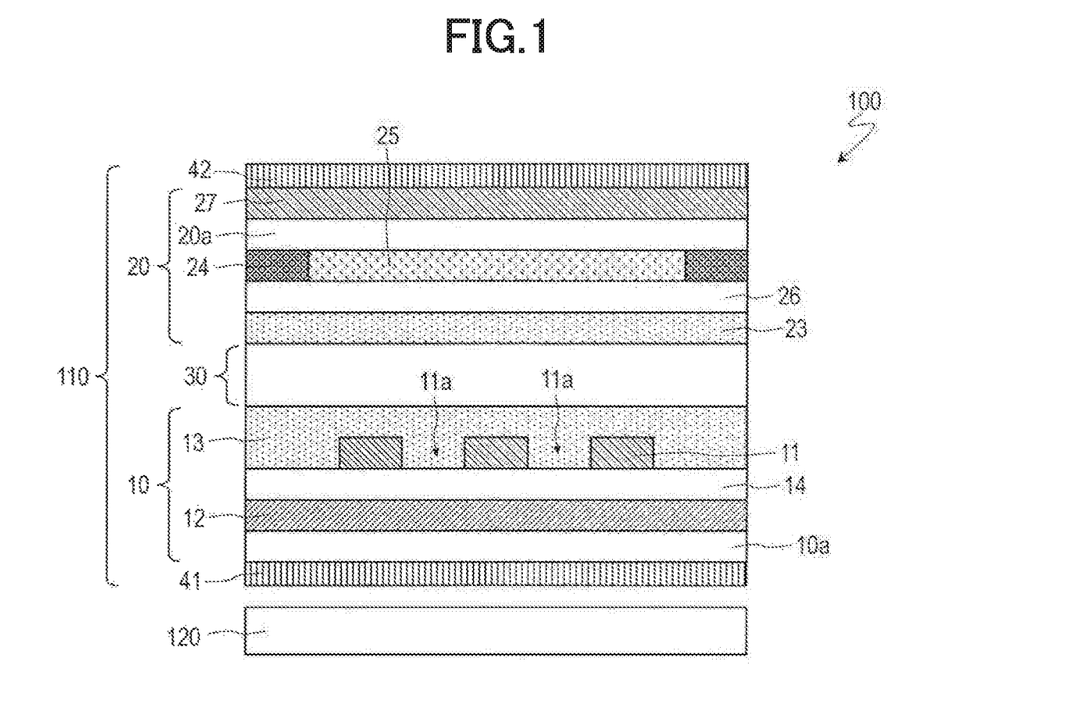
FIG. 1 is a cross-sectional view schematically illustrating a liquid crystal display device 100 manufactured in accordance with a manufacturing method according to an embodiment of the present invention.

First, a configuration of a liquid crystal display device 100 manufactured by a manufacturing method according to the present embodiment will be described with reference to FIG. 1. FIG. 1 is a cross-sectional view schematically illustrating the liquid crystal display device 100.

As illustrated in FIG. 1, the liquid crystal display device 100 includes a liquid crystal display panel 110 and a backlight 120. The liquid crystal display device 100 performs display in an FFS mode.

The liquid crystal display panel 110 includes an active matrix substrate 10, a counter substrate 20 facing the active matrix substrate 10, and a liquid crystal layer 30 provided between the active matrix substrate 10 and the counter substrate 20. In addition, the liquid crystal display panel 110 includes a plurality of pixels. The plurality of pixels are arrayed in a matrix shape including a plurality of rows and a plurality of columns.

The active matrix substrate (sometimes referred to as a "TFT substrate") 10 includes a transparent substrate 10a, a first electrode 11, a second electrode 12, and an alignment film 13.

The transparent substrate (a first substrate) 10a is, for example, a glass substrate or a plastic substrate. The first electrode 11, the second electrode 12, and the alignment film 13 are provided on the liquid crystal layer 30 side of the transparent substrate 10a, and are supported by the transparent substrate 10a.

The alignment film 13 is provided so as to be in contact with the liquid crystal layer 30 (in other words, located at the outermost surface of the active matrix substrate 10 on the liquid crystal layer 30 side). The alignment film 13 defines an initial alignment direction of liquid crystal molecules. The initial alignment direction is an alignment direction of the liquid crystal molecules when no electric field is applied to the liquid crystal layer 30.

The first electrode 11 and the second electrode 12 are provided between the transparent substrate 10a and the alignment film 13, and generate a fringe electric field that causes the liquid crystal molecules to be aligned in a direction different from the initial alignment direction. The first electrode 11 and the second electrode 12 are each formed from a transparent conductive material (indium tin oxide (ITO), or indium zinc oxide (IZO), for example).

The first electrode 11 is a pixel electrode provided in each of a plurality of pixels. In contrast, the second electrode 12 is a common electrode that is commonly provided for a plurality of pixels. The pixel electrode 11 is provided on the common electrode 12 with an insulating layer 14 interposed therebetween. The insulating layer 14 is a silicon nitride (SiNx) layer, a silicon oxide ($SiO_2$) layer, or a silicon oxynitride (SiNxOy) layer. Alternatively, the insulating layer 14 may have a layered structure including two of those layers. The pixel electrode 11 has at least one (two in the present embodiment) slit 11a. A direction of the fringe electric field generated by the pixel electrode 11 and the common electrode 12 is a direction orthogonal to a direction in which the slits 11a extend.

Although not illustrated here, the active matrix substrate 10 further includes a thin film transistor (TFT) provided for each of the pixels, a scanning line (a gate bus line) that supplies a scanning signal (a gate signal) to the TFT, and a signal line (a source bus line) that supplies a display signal (a source signal) to the TFT. A gate electrode, a source electrode, and a drain electrode of the TFT are respectively electrically connected to the scanning line, the signal line, and the pixel electrode 11. An oxide semiconductor TFT can be suitably used as the TFT. A TFT other than the oxide semiconductor TFT may also be used.

A display signal voltage is applied to the pixel electrode 11 via the TFT. A voltage (common voltage) Vcom, which is common to all the pixels, is applied to the common electrode 12. The common voltage is set to be an optimal value (hereinafter referred to as an "optimal Vcom") from a perspective of reducing flicker.

The counter substrate (sometimes also referred to as a "color filter substrate") 20 includes a transparent substrate 20a and an alignment film 23.

The transparent substrate (a second substrate) 20a is, for example, a glass substrate or a plastic substrate. The alignment film 23 is provided on the liquid crystal layer 30 side of the transparent substrate 20a and is supported by the transparent substrate 20a.

The alignment film 23 is provided so as to be in contact with the liquid crystal layer 30 (in other words, the alignment film 23 is located on the outermost surface of the counter substrate 20 on the liquid crystal layer 30 side). In a similar manner to the alignment film 13 of the active matrix substrate 10, the alignment film 23 defines the initial alignment direction of the liquid crystal molecules. The alignment direction of the liquid crystal molecules defined by the alignment film 23 is parallel to or antiparallel to the alignment direction of the liquid crystal molecules defined by the alignment film 13.

In an example illustrated in FIG. 1, the counter substrate 20 further includes a light blocking layer (a black matrix) 24, a color filter layer 25, an overcoat layer 26, and a transparent conductive layer 27.

The light blocking layer 24 and the color filter layer 25 are provided on the liquid crystal layer 30 side of the transparent substrate 20a. The color filter layer 25 includes, for example, a red color filter, a green color filter, and a blue color filter.

The overcoat layer 26 covers the light blocking layer 24 and the color filter layer 25. The overcoat layer 26 is formed from a transparent resin material, for example. The alignment film 23 is provided on the overcoat layer 26.

The transparent conductive layer 27 is provided on a side of the transparent substrate 20a opposite from the liquid crystal layer 30 (on the side of an observer). The transparent conductive layer 27 is formed from a transparent conductive material (ITO or IZO, for example). The transparent conductive layer 27 can prevent an electro-static charge caused by static electricity. The transparent conductive layer 27 may be omitted.

In the present embodiment, the liquid crystal layer 30 includes the liquid crystal molecules having negative dielectric anisotropy. In other words, the liquid crystal layer 30 is formed from a negative liquid crystal material. When the liquid crystal molecules have the negative dielectric anisotropy, the alignment direction of the liquid crystal molecules is changed by an alignment regulating force generated by the fringe electric field, so as to become closer to a direction orthogonal to the direction of the fringe electric field.

The alignment films 13 and 23, which are disposed on both sides of the liquid crystal layer 30, are both horizontal alignment films. Therefore, the liquid crystal molecules are aligned substantially parallel to the surfaces of the active matrix substrate 10 and the counter substrate 20. In the present embodiment, an optical alignment treatment is performed on the alignment films 13 and 23. In other words, the alignment films 13 and 23 are optical alignment films. The optical alignment film may be one of isomerized, decomposed, or dimerized. Each of the isomerized, decomposed, and dimerized optical alignment films is formed from a material (a polymer containing such a functional group) that respectively causes an isomerization reaction, a decomposition reaction, and a dimerization reaction in response to irradiation of light.

Note that the alignment films 13 and 23 and/or the liquid crystal layer 30 need not necessarily include
a photopolymerizable group.

The backlight 120 is disposed on a back surface side (the opposite side from the observer) of the liquid crystal display panel 110. The backlight 120 irradiates the liquid crystal display panel 110 with light, which is used for display. Various known illumination devices can be used as the backlight 120.

In addition, the liquid crystal display device 100 further includes a pair of polarizers 41 and 42 that face each other with at least the liquid crystal layer 30 interposed therebetween. The pair of polarizers 41 and 42 are arranged in a crossed-Nicol manner. A transmission axis of one of the pair of polarizers 41 and 42 is substantially parallel to the initial alignment direction of the liquid crystal molecules, and a transmission axis of the other of the polarizers 41 and 42 is substantially orthogonal to the initial alignment direction. The polarizer 41 is disposed on a back surface side of the transparent substrate 10a of the active matrix substrate 10. The polarizer 42 is disposed on a front surface side of the transparent substrate 20a of the counter substrate 20.

The alignment films 13 and 23 are alignment films each having a specific resistance of $1 \times 10^{14}$ $\Omega \cdot$cm or greater when the backlight 120 is illuminated. In other words, the alignment films 13 and 23 are considered to be alignment films each having a higher specific resistance than those of conventional typical alignment films.

Next, a method for manufacturing the liquid crystal display device 100 according to the present embodiment will be described.

The method for manufacturing the liquid crystal display device 100 according to the present embodiment includes a step (A) of preparing the active matrix substrate 10, a step (B) of preparing the counter substrate 20, and a step (C) of producing the liquid crystal display panel 110 using the prepared active matrix substrate 10 and counter substrate 20.

The step (A) may be performed using various known techniques for producing the active matrix substrate for the FFS mode liquid crystal display device. However, an alignment film material is used such that the specific resistance of the alignment film 13 is $1 \times 10^{14}$ $\Omega \cdot$cm or greater. Here, since the alignment film 13 is the optical alignment film, the step (A) may include a step (A1) of irradiating the alignment film 13 with polarized ultraviolet light to perform the optical alignment treatment.

The step (B) may be performed using various known techniques for producing the counter substrate for the FFS mode liquid crystal display device. However, an alignment film material is used such that the specific resistance of the alignment film 23 is $1 \times 10^{14}$ $\Omega \cdot$cm or greater. Here, since the alignment film 23 is the optical alignment film, the step (B) may include a step (B1) of irradiating the alignment film 23 with polarized ultraviolet light to perform the optical alignment treatment.

The step (C) includes a step (C1) of bonding the active matrix substrate 10 with the counter substrate 20 with a predetermined gap interposed therebetween, and a step (C2) of forming the liquid crystal layer 30, before or after the step (C1).

The step (C1) may be performed using a known technique for bonding the active matrix substrate 10 with the counter substrate 20. For example, the active matrix substrate 10 and the counter substrate 20 are bonded together via a sealing material provided on one of the active matrix substrate 10 and the counter substrate 20.

The step (C2) may be performed using, for example, a vacuum injection method or a dropping method. When the vacuum injection method is used, the step (C2) is performed after the step (C1) (in other words, after bonding both the substrates together). When the dropping method is used, the step (C2) is performed before the step (C1) (in other words, before bonding both the substrates together).

The step (C) of producing the liquid crystal display panel 110 further includes, after the steps (C1) and (C2), a step (C3) of irradiating the active matrix substrate 10, the liquid crystal layer 30, and the counter substrate 20 with ultraviolet light. The ultraviolet light that is irradiated at the step (C3) may be substantially unpolarized ultraviolet light, or may be polarized ultraviolet light. At the step (C3), the ultraviolet light is irradiated substantially parallel to a normal direction of the display surface, for example. After the step (C3), the step (C) may further include a step (C4) of adhering a polarizer to the back surface side of the transparent substrate (first substrate) 10a of the active matrix substrate 10, and a step (C5) of adhering a polarizer to the front surface side of the transparent substrate (second substrate) 20a of the counter substrate 20.

According to the above-described manufacturing method of the present embodiment, it is possible to suppress a shift in the optimal Vcom. Reasons for this will be described below.

The present inventors have conducted various studies on the shift in the optimal Vcom (hereinafter also simply referred to as a "Vcom shift") that occurs when the optical alignment film having a high specific resistance is used. In the FFS mode liquid crystal display device, electrodes are provided only on the active matrix substrate side, and there are no electrodes provided on the counter substrate side. Therefore, the active matrix substrate and the counter substrate can be considered to be electrically asymmetric. In addition, since the pixel electrode and the common electrode differ in their arrangements and shapes, the electrical asymmetry is large even between the electrodes (between the pixel electrode and the common electrode). Therefore, polarity is easily biased in accordance with driving, and this is considered to be a cause of the Vcom shift.

As a result of further study, the present inventors have discovered that the Vcom shift can be suppressed by performing the step (C3) of irradiating the active matrix substrate 10, the liquid crystal layer 30, and the counter substrate 20 with the ultraviolet light, after the step (C1) of bonding the active matrix substrate 10 with the counter substrate 20 and the step (C2) of forming the liquid crystal layer 30.

Further, the present inventors have also found that an irradiation amount of the ultraviolet light at the step (C3) is preferably from 5 J/cm$^2$ to 25 J/cm$^2$, and a peak wavelength of the ultraviolet light irradiated at the step (C3) is preferably from 370 nm to 400 nm.

Here, verification results will be described in which it is verified that the Vcom shift can be suppressed by the irradiation of ultraviolet light. In order to verify the suppression of the Vcom shift, the Vcom shift, flicker, and reliability were evaluated using prepared samples.

Preparation of Samples

First, a plurality of FFS modules (FFS mode liquid crystal display devices) having the same structure and formed from the same material were prepared. Specifically, 16 FFS modules were prepared as samples 1 to 16. In each of the prepared FFS modules, the liquid crystal display panel is in a state in which a polarizer is not provided on the active matrix substrate side, and has the electrode structure illustrated in FIG. 1 (the structure in which the common electrode, the insulating layer, and the pixel electrode are layered in this order from the lower layer side). The liquid crystal layer is formed from a negative liquid crystal material having a dielectric constant anisotropy $\Delta\varepsilon$ of −3.4, and the alignment film is an optical alignment film having a specific resistance of $1\times10^{14}$ $\Omega\cdot$cm or greater when the backlight is illuminated. The backlight has a luminance of approximately 10000 cd/m$^2$.

Each of the modules was irradiated once with ultraviolet light from the active matrix substrate side. A light source and an irradiation amount of the ultraviolet light used for each of the samples #1 to #16 are as shown in Table 1 below. As shown in Table 1, three types of light source A, B, and C were used as the light source. Peak wavelengths of the ultraviolet light emitted by the light sources A, B, and C are approximately 365 nm, approximately 313 nm, and approximately 380 nm, respectively.

TABLE 1

| Sample | Ultraviolet Light Source | Irradiation Amount of Ultraviolet Light |
|---|---|---|
| #1 | Light Source A | 0 J/cm$^2$ |
| #2 | (Peak Wavelength: | 0 J/cm$^2$ |
| #3 | Approximately 365 nm) | 1 J/cm$^2$ |
| #4 | | 3 J/cm$^2$ |
| #5 | | 6 J/cm$^2$ |
| #6 | | 13 J/cm$^2$ |
| #7 | | 26 J/cm$^2$ |
| #8 | | 39 J/cm$^2$ |
| #9 | Light Source B | 0 J/cm$^2$ |
| #10 | (Peak Wavelength: | 7 J/cm$^2$ |
| #11 | Approximately 313 nm) | 21 J/cm$^2$ |
| #12 | | 41 J/cm$^2$ |
| #13 | Light Source C | 0 J/cm$^2$ |
| #14 | (Peak Wavelength: | 6 J/cm$^2$ |
| #15 | Approximately 380 nm) | 12 J/cm$^2$ |
| #16 | | 18 J/cm$^2$ |

Evaluation of Vcom Shift

Evaluation of the Vcom shift was performed using the following procedure.

(1) Switch a display screen of each of the modules to a frame inversion screen having a drive frequency of 60 Hz and at the 128th gray scale. Note that "Nth gray scale" in the present specification refers to the Nth gray scale when performing display using 0th to 255th gray scales (that is, when using 256 gray scale display). Therefore, the "128th gray scale" refers to the 128th gray scale in the 256 gray scale display, and the "255th gray scale" refers to the 255th gray scale (the highest gray scale) in the 256 gray scale display.

(2) Measure a flicker level at the center of the display screen of each of the modules using an optical characteristic evaluation device CA-310 (manufactured by Konica Minolta, Inc.) while changing a set value of the common voltage Vcom (a Vcom set value). The Vcom set value obtained when the flicker level becomes minimum is considered to be the optimal Vcom for each of the modules.

(3) Switch the display screen of each of the modules to an illuminated screen having the drive frequency of 60 Hz and at the 255th gray scale, and leave the illuminated screen as it is for a fixed time period (aging). At this time, the Vcom set value is set to be the optimal Vcom obtained immediately before the aging.

(4) After the fixed time period has elapsed with the illuminated screen at the 255th gray scale, perform (1) and (2), and determine the optimal Vcom at that time.

(5) After that, repeat (3) and (4).

Evaluation of Flicker

Evaluation of the flicker level was performed in the following manner.

All of the pixels of each of the modules were illuminated at the 128th gray scale, and the drive frequency was set to be 30 Hz. The flicker level at the optimal Vcom value of each of the modules was measured using the optical characteristic evaluation device CA-310. A 30 Hz component of the flicker level was considered to be the flicker level of the module.

Evaluation of Reliability

Evaluation of reliability was performed in the following manner.

With the Vcom value of each of the modules set to be the optimal Vcom value, aging was performed on each of the modules under an environment of 60° C. while displaying a black and white checker pattern (a pattern including regions at the 0th gray scale display and regions at the 255th gray scale display). At this time, the drive frequency was set to be 60 Hz.

After approximately 500 hours has elapsed from the start of the aging, the aging was terminated (the driving of the module was turned off, and the environment was changed to room temperature), and each of the modules was left as it was for approximately 2 hours. After that, the presence or absence of spots (uneven brightness) in each of the modules was visually checked at each of the drive frequencies of 60 Hz and 30 Hz. At each of the drive frequencies, the visual check was performed on three types of halftone display screens, namely, the 32th gray scale, the 64th gray scale, and the 128th gray scale display screens.

Evaluation Results

Figure 2:
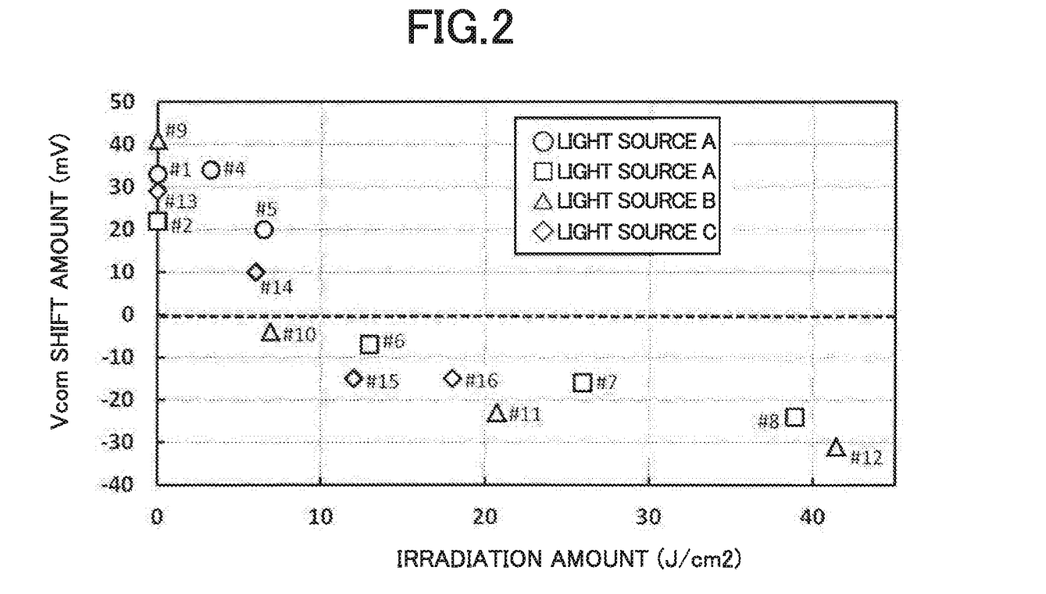
FIG. 2 is a graph showing a Vcom shift amount when two-hour illumination is performed with respect to samples #1, #2, and #4 to #16.
Figure 3:
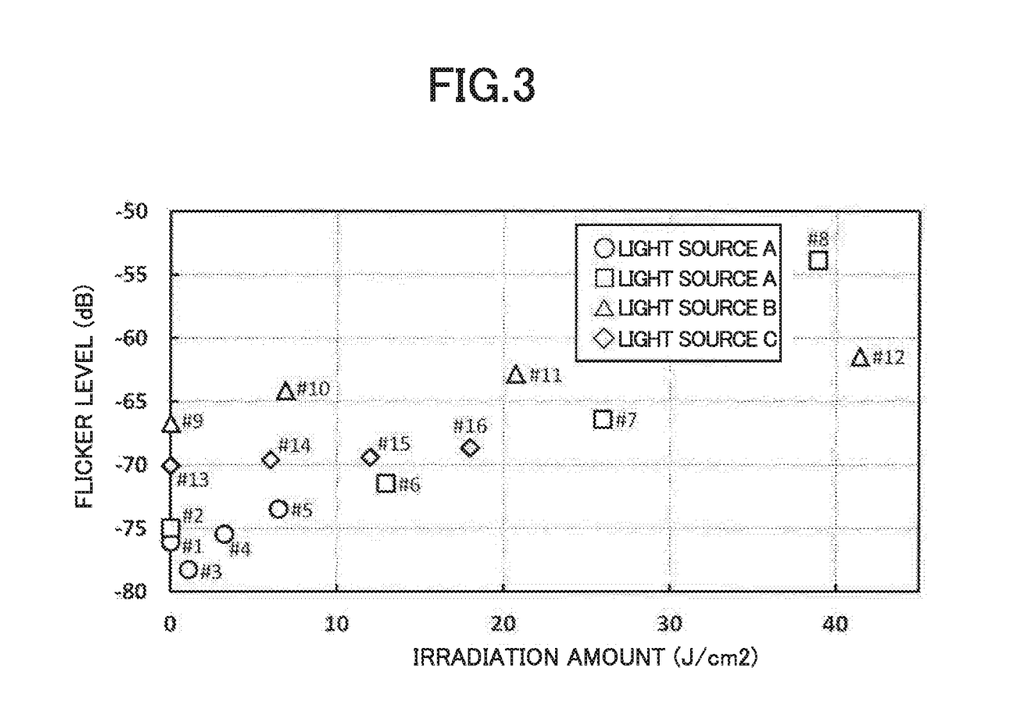
FIG. 3 is a graph showing a flicker level with respect to samples #1 to #16.

FIG. 2 shows an amount of the Vcom shift obtained when the two-hour illumination was performed with respect to the samples #1, #2, and #4 to #16. FIG. 2 is a graph in which the horizontal axis is the irradiation amount of ultraviolet light and the vertical axis is the amount of Vcom shift. Here, the amount of Vcom shift is a value obtained by subtracting the optimal Vcom value immediately before the illumination from the optimal Vcom value two hours after the illumination. In addition, FIG. 3 shows a flicker level of the samples #1 to #16. FIG. 3 is a graph in which the horizontal axis is the irradiation amount of ultraviolet light and the vertical axis is the flicker level.

From FIG. 2, it can be understood that as the amount of ultraviolet light increases, the amount of Vcom shift tends to decrease. In other words, it has been confirmed that the irradiation of ultraviolet light can effectively suppress the Vcom shift, and a behavior of the Vcom shift can be controlled by the irradiation amount.

Although the reason why the Vcom shift can be suppressed by the irradiation of ultraviolet light is not necessarily clear, it is conceivable that some components of the alignment film, the liquid crystal material, and the like are radicalized by the irradiation of ultraviolet light. As a result of radicals becoming ionic impurities and eluting into the liquid crystal layer, the specific resistance of the liquid crystal layer is reduced. In the FFS mode liquid crystal display device, the insulating film, the alignment film, the liquid crystal layer, and the like are included in a region in which the electric field is generated between the common electrode and the pixel electrode (a path through which a line of electric force passes). It is conceivable that since an equivalent circuit formed between the common electrode and the pixel electrode changes when the specific resistance of the liquid layer changes, the symmetry (optimal Vcom value) obtained when positive and negative voltages are applied to the pixel electrode changes, and it is thus possible to control the behavior of the Vcom shift.

Although the Vcom shift may cause the flicker, burn-in, or the like to worsen, it is considered that the risk is small as long as the amount of Vcom shift after the two-hour illumination falls within ±20 mV. From FIG. 2, it can be seen that when the irradiation amount is within a range from 5 J/cm$^2$ to 25 J/cm$^2$, the amount of Vcom shift can be suppressed to the level of approximately ±20 mV. Further, from FIG. 3, it can be seen that when the irradiation amount is within the range from 5 J/cm$^2$ to 25 J/cm$^2$, the flicker level can also be maintained to be −60 dB or less. Thus, the irradiation amount of ultraviolet light is preferably from 5 J/cm$^2$ to 25 J/cm$^2$ Evaluation results of the reliability (status of visible appearance of the spots) are shown in Tables 2, 3, and 4 to be described below. Results of the samples #2, #6, and #7, which used the light source A, are shown in Table 2, results of the samples #9, #10, and #11, which used the light source B, are shown in Table 3, and results of the samples #13, #14, and #15, which used the light source C, are shown in Table 4. The visible appearance of the spots is indicated as "⊚" when no spots are visible, as "○" when the spots are slightly visible, and as "Δ" when the spots are easily visually recognized.

TABLE 2

Light Source A

| Frequency | Sample #2 (Irradiation Amount: 0 J/cm$^2$) | Sample #6 (Irradiation Amount: 13 J/cm$^2$) | Sample #7 (Irradiation Amount: 26 J/cm$^2$) |
|---|---|---|---|
| 60 Hz | ⊚ | ○ | Δ |
| 30 Hz | ○ | Δ | Δ |

TABLE 3

Light Source B

| Frequency | Sample #9 (Irradiation Amount: 0 J/cm$^2$) | Sample #10 (Irradiation Amount: 7 J/cm$^2$) | Sample #11 (Irradiation Amount: 21 J/cm$^2$) |
|---|---|---|---|
| 60 Hz | ⊚ | ○ | Δ |
| 30 Hz | ○ | Δ | Δ |

TABLE 4

Light Source C

| Frequency | Sample #13 (Irradiation Amount: 0 J/cm$^2$) | Sample #14 (Irradiation Amount: 6 J/cm$^2$) | Sample #15 (Irradiation Amount: 12 J/cm$^2$) |
|---|---|---|---|
| 60 Hz | ⊚ | ⊚ | ⊚ |
| 30 Hz | ○ | ○ | ○ |

As shown in Tables 2 and 3, when the light source A or the light source B is used, the spots become more visible as the irradiation amount increases. In contrast, as shown in Table 4, when the light source C is used, the spots are not easily visible even when the irradiation amount increases.

Further, when the light source A or the light source B is used, it can be seen from FIG. 3 that the flicker worsens as the irradiation amount increases. In contrast, when the light source C is used, the flicker is less likely to worsen even when the irradiation amount increases.

As can be seen from these results, the peak wavelength of the ultraviolet light irradiated at the step (C3) is preferably from 370 nm to 400 nm.

As described above, according to the embodiment of the present invention, it is possible to suppress the shift in the optimal Vcom when using the alignment film having a high specific resistance in the FFS mode liquid crystal display device.

Note that in the above description, an example is illustrated in which the ultraviolet light is irradiated from the active matrix substrate 10 side at the step (C3), but the ultraviolet light may be irradiated from the counter substrate 20 side at the step (C3). However, depending on the material of the color filter 25, there is a risk that the ultraviolet light may be absorbed by the color filter 25. When the ultraviolet light is irradiated from the active matrix substrate 10 side, there is no such concern.

When the ultraviolet light is irradiated from the active matrix substrate 10 side, the polarizer 42 may or may not be adhered to the front surface side of the transparent substrate 20a of the counter substrate 20 at the step (C3). Similarly, when the ultraviolet light is irradiated from the counter substrate 20 side, the polarizer 41 may or may not be adhered to the back surface side of the transparent substrate 10a of the active matrix substrate 10 at the step (C3).

Here, a configuration is illustrated, as an example, in which the alignment films 13 and 23 are the optical alignment films, but the alignment films 13 and 23 need not necessarily be the optical alignment films, and may be, for example, alignment films which have been subjected to a rubbing treatment.

Further, although a case is illustrated above, as an example, in which the liquid crystal molecules of the liquid crystal layer 30 have the negative dielectric anisotropy (in other words, the liquid crystal layer 30 is formed from the negative liquid crystal material), the liquid crystal molecules of the liquid crystal layer 30 may have positive dielectric anisotropy (in other words, the liquid crystal layer 30 may also be formed from a positive liquid crystal material).

Further, as already described above, since the flicker is more likely to be evident when the low frequency drive is executed, the embodiment of the present invention has a greater significance when the driving is performed at a relatively low drive frequency, more specifically, when the driving is performed at a drive frequency of 40 Hz or less.

The liquid crystal display device according to the embodiment of the present invention is suitably used in various types of electronic apparatus, such as a smartphone and a tablet.

Oxide Semiconductor

The oxide semiconductor TFT includes an oxide semiconductor layer as an active layer. An oxide semiconductor included in the oxide semiconductor layer may be an amorphous oxide semiconductor, or may be a crystalline oxide semiconductor including a crystalline portion. Examples of the crystalline oxide semiconductor include a polycrystalline oxide semiconductor, a microcrystalline oxide semiconductor, or a crystalline oxide semiconductor having a c-axis aligned substantially perpendicular to the layer surface.

The oxide semiconductor layer may have a layered structure including two or more layers. When the oxide semiconductor layer has the layered structure, the oxide semiconductor layer may include an amorphous oxide semiconductor layer and a crystalline oxide semiconductor layer. Alternatively, the oxide semiconductor layer may include a plurality of crystalline oxide semiconductor layers having different crystal structures. In addition, the oxide semiconductor layer may include a plurality of the amorphous oxide semiconductor layers. When the oxide semiconductor layer has a dual-layer structure including an upper layer and a lower layer, an energy gap of the oxide semiconductor included in the upper layer is preferably greater than an energy gap of the oxide semiconductor included in the lower layer. However, when a difference in the energy gap between these layers is relatively small, the energy gap of the oxide semiconductor in the lower layer may be greater than the energy gap of the oxide semiconductor in the upper layer.

Materials, structures, and film formation methods of the amorphous oxide semiconductor and each of the above-described crystalline oxide semiconductors, a configuration of the oxide semiconductor layer having the layered structure, and the like are described in JP 2014-007399 A, for example. The entire contents of the disclosure of JP 2014-007399 A are incorporated herein by reference.

The oxide semiconductor layer may include, for example, at least one metal element selected from In, Ga, and Zn. In the present embodiment, the oxide semiconductor layer 18 includes, for example, an In—Ga—Zn—O based semiconductor (indium gallium zinc oxide, for example). Here, the In—Ga—Zn—O based semiconductor is a ternary oxide of In (indium), Ga (gallium), and Zn (zinc), and a ratio (composition ratio) of In, Ga, and Zn is not particularly limited. For example, the ratio includes In:Ga:Zn=2:2:1, In:Ga:Zn=1:1:1, or In:Ga:Zn=1:1:2. Such an oxide semiconductor layer can be formed of an oxide semiconductor film including the In—Ga—Zn—O based semiconductor.

The In—Ga—Zn—O based semiconductor may be an amorphous semiconductor, or may be a crystalline semiconductor. A crystalline In—Ga—Zn—O based semiconductor in which a c-axis thereof is aligned substantially perpendicular to the layer surface is preferable as the crystalline In—Ga—Zn—O based semiconductor.

Note that a crystal structure of the crystalline In—Ga—Zn—O based semiconductor is disclosed, for example, in JP 2014-007399 A described above, JP 2012-134475 A, JP 2014-209727 A, and the like. The entire contents of the disclosure of JP 2012-134475 A and JP 2014-209727 A are incorporated herein by reference. A TFT including the In—Ga—Zn—O based semiconductor layer has high mobility (more than 20 times compared to an a-Si TFT) and a low leakage current (less than 1/100th compared to the a-Si TFT). Thus, such a TFT can be suitably used as a drive TFT (a TFT included in a drive circuit provided in a periphery of a display region including a plurality of pixels, and on the same substrate as the display region, for example) and a pixel TFT (a TFT provided in a pixel).

In place of the In—Ga—Zn—O based semiconductor, the oxide semiconductor layer may include another oxide semiconductor. For example, the oxide semiconductor layer may include an In—Sn—Zn—O based semiconductor ($In_2O_3$—$SnO_2$—ZnO; InSnZnO, for example). The In—Sn—Zn—O based semiconductor is a ternary oxide of In (indium), Sn (tin), and Zn (zinc). Alternatively, the oxide semiconductor layer may include an In—Al—Zn—O based semiconductor, an In—Al—Sn—Zn—O based semiconductor, a Zn—O based semiconductor, an In—Zn—O based semiconductor, a Zn—Ti—O based semiconductor, a Cd—Ge—O based semiconductor, a Cd—Pb—O based semiconductor, CdO (cadmium oxide), an Mg—Zn—O based semiconductor, an In—Ga—Sn—O based semiconductor, an In—Ga—O based semiconductor, a Zr—In—Zn—O based semiconductor, an Hf—In—Zn—O based semiconductor, an Al—Ga—Zn—O based semiconductor, a Ga—Zn—O based semiconductor, an In—Ga—Zn—Sn—O based semiconductor, and the like.

Figure 4:
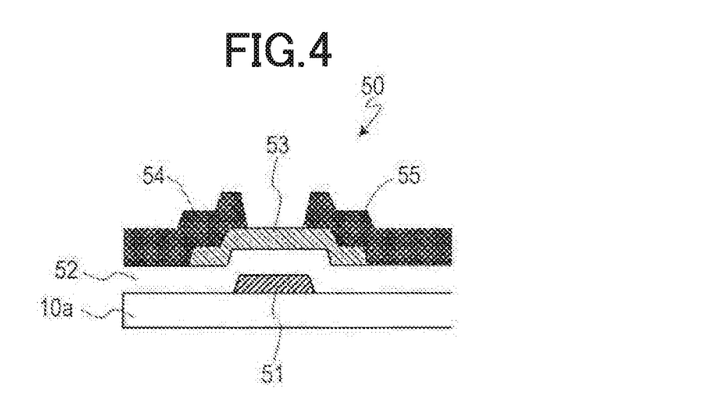
FIG. 4 is a cross-sectional view illustrating an example of an oxide semiconductor TFT.

An example of a configuration of the oxide semiconductor TFT is illustrated in FIG. 4. An oxide semiconductor TFT 50 illustrated in FIG. 4 includes a gate electrode 51, a gate insulating layer 52, an oxide semiconductor layer 53, a source electrode 54, and a drain electrode 55. Note that the oxide semiconductor TFT 50 illustrated in FIG. 4 is a "channel etched type", but the oxide semiconductor TFT may be an "etch stop type".

Channel Etch

In the "channel etched type TFT", for example, as illustrated in FIG. 4, no etch stop layer is formed on a channel region, and lower faces of channel-side end portions of the source electrode and the drain electrode are disposed so as to be in contact with an upper face of the oxide semiconductor layer. The channel etched type TFT is formed by forming a conductive film for the source and drain electrodes on the oxide semiconductor layer, and separating the conductive film into the source and drain, for example. In the source/drain separation process, a surface portion of the channel region may be etched.

Etch Stop

On the other hand, in a TFT including an etch stop layer formed on the channel region (the etch stop type TFT), the lower faces of the channel-side end portions of the source electrode and the drain electrode are positioned on the etch stop layer, for example. The etch stop type TFT is formed, for example, by forming the etch stop layer covering a portion to be the channel region of the oxide semiconductor layer, then forming the conductive film for the source and drain electrodes on the oxide semiconductor layer and the etch stop layer, and performing the source/drain separation.

According to the embodiment of the present invention, the shift in the optimal Vcom can be suppressed when using the alignment film having a high specific resistance in the FFS mode liquid crystal display device.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A method for manufacturing a liquid crystal display device that includes a liquid crystal display panel including an active matrix substrate, a counter substrate facing the active matrix substrate, and a liquid crystal layer provided between the active matrix substrate and the counter substrate, and a backlight disposed on a back surface side of the liquid crystal display panel,
the active matrix substrate including a first substrate,
an alignment film that is provided on the liquid crystal layer side of the first substrate and defines an initial alignment direction of liquid crystal molecules, and a pixel electrode and a common electrode that are provided between the first substrate and the alignment film and generate a fringe electric field that causes the liquid crystal molecules to be aligned in a different direction from the initial alignment direction, the method comprising:

a step (A) of preparing the active matrix substrate;

a step (B) of preparing the counter substrate; and a step (C) of producing the liquid crystal display panel using the active matrix substrate and counter substrate prepared, wherein the step (C) includes
- a step (C1) of bonding the active matrix substrate with the counter substrate with a predetermined gap interposed between the active matrix substrate and the counter substrate, and
- a step (C2) of forming the liquid crystal layer at one of before and after the step (C1),
- the alignment film is an alignment film having a specific resistance of $1 \times 10^{14}$ Ω·cm or greater when the backlight is illuminated, and
- the step C further includes, after the steps (C1) and (C2), a step (C3) of irradiating the active matrix substrate, the liquid crystal layer, and the counter substrate with ultraviolet light.

2. The method according to claim 1, wherein an irradiation amount of the ultraviolet light is from 5 J/cm$^2$ to 25 J/cm$^2$ at the step (C3).

3. The method according to claim 1, wherein a peak wavelength of the ultraviolet light irradiated at the step (C3) is from 370 nm to 400 nm.

4. The method according to claim 1, wherein the irradiation of ultraviolet light is performed from a side of the active matrix substrate at the step (C3).

5. The method according to claim 4, wherein the step (C) further includes, after the step (C3), a step (C4) of adhering a polarizer to a back surface side of the first substrate.

6. The method according to claim 1, wherein the alignment film is an optical alignment film.

7. The method according to claim 6, wherein the optical alignment film is one of an isomerized, decomposed, and dimerized optical alignment film.

8. The method according to claim 6, wherein the step (A) includes a step (A1) of irradiating the alignment film with polarized ultraviolet light to perform an optical alignment treatment.

9. The method according to claim 1, wherein the liquid crystal molecules have negative dielectric anisotropy.

10. The method according to claim 1, wherein the liquid crystal display device is configured to be driven at a frequency of 40 Hz or less.

11. The method according to claim 1, wherein the pixel electrode is provided on the common electrode with an insulating layer interposed between the pixel electrode and the common electrode.

12. The method according to claim 11, wherein the insulating layer includes one of a silicon nitride layer, a silicon oxide layer, and a silicon oxynitride layer.

13. The method according to claim 12, wherein the insulating layer has a layered structure including two layers of the silicon nitride layer, the silicon oxide layer, and the silicon oxynitride layer.

14. The method according to claim 1, wherein the counter substrate includes a second substrate and a color filter layer provided on the liquid crystal layer side of the second substrate.

15. The method according to claim 14, wherein the counter substrate further includes an overcoat layer covering the color filter layer.

16. The method according to claim 1, wherein the counter substrate includes a second substrate, and an additional alignment film that is provided on the liquid crystal layer side of the second substrate and defines an initial alignment direction of liquid crystal molecules.

17. The method according to claim 16, wherein the additional alignment film is an optical alignment film.

18. The method according to claim 17, wherein the additional alignment film is one of an isomerized, decomposed, and dimerized optical alignment film.

19. The method according to claim 17, wherein the step (B) includes a step (B1) of irradiating the additional alignment film with polarized ultraviolet light to perform an optical alignment treatment.

20. The method according to claim 1, wherein the active matrix substrate further includes a TFT electrically connected to the pixel electrode, and the TFT includes an oxide semiconductor layer.

21. The method according to claim 1, wherein the step (C3) of irradiating the active matrix substrate, the liquid crystal layer, and the counter substrate with the ultraviolet light after the steps (C1) and (C2) includes a step of irradiating the liquid crystal display panel with the ultraviolet light.

22. The method according to claim 21, wherein the ultraviolet light is irradiated to the liquid crystal display panel from an active matrix substrate side of the liquid crystal display panel.

* * * * *